US005726351A

United States Patent [19]
Glaser

[11] Patent Number: 5,726,351
[45] Date of Patent: Mar. 10, 1998

[54] SPARK PLUG COMPRISING A FORCE MEASURING ELEMENT

[75] Inventor: Josef Glaser, Graz, Austria

[73] Assignee: AVL Gesellschaft für Verbrennungskraftmaschinen und Messtechnik m.b.H. Prof.Dr.Dr.h.c. Hans List, Graz, Austria

[21] Appl. No.: 574,219

[22] Filed: Dec. 18, 1995

[30] Foreign Application Priority Data

Dec. 19, 1994 [AT] Austria .................. 2363/94

[51] Int. Cl.$^6$ .................. G01M 15/00; G01L 9/08
[52] U.S. Cl. .................. 73/115; 73/35.11; 73/35.12; 73/35.13; 73/116; 73/714; 313/323
[58] Field of Search .................. 73/115, 116, 117.2, 73/117.3, 118.1, 118.2, 714, 720, 35.01, 35.17, 721; 313/238, 239, 240, 252, 283, 284, 286, 289, 323, 324

[56] References Cited

U.S. PATENT DOCUMENTS

| 4,169,388 | 10/1979 | Teitelbaum et al. | 73/714 |
| 4,602,506 | 7/1986 | Sawamoto et al. | 73/115 |
| 4,909,071 | 3/1990 | Amano et al. | 73/115 |
| 4,969,353 | 11/1990 | Steinke | 73/115 |
| 5,101,659 | 4/1992 | Takeuchi | 73/115 |
| 5,315,875 | 5/1994 | Benedikt et al. | 73/115 |

FOREIGN PATENT DOCUMENTS

| 441157 | 8/1991 | European Pat. Off. |
| 581067 | 2/1994 | European Pat. Off. |
| 1212282 | 10/1959 | France . |
| 656168 | 1/1938 | Germany . |
| 3130238 | 2/1983 | Germany . |

Primary Examiner—George M. Dombroske
Attorney, Agent, or Firm—Watson Cole Stevens Davis, P.L.L.C.

[57] ABSTRACT

A spark plug with an insulating body held in a casing and containing an inner electrode is provided with a force-measuring element for measuring the pressure acting on the spark plug, the insulating body resting against the casing via the force-measuring element when pressure is applied in an axial direction. To prevent the entrance of noise signals an axially-elastic sealing element is provided on a side adjacent to the combustion space, the sealing element additionally lending radial support to the insulating body resting against the casing of the spark plug.

7 Claims, 4 Drawing Sheets

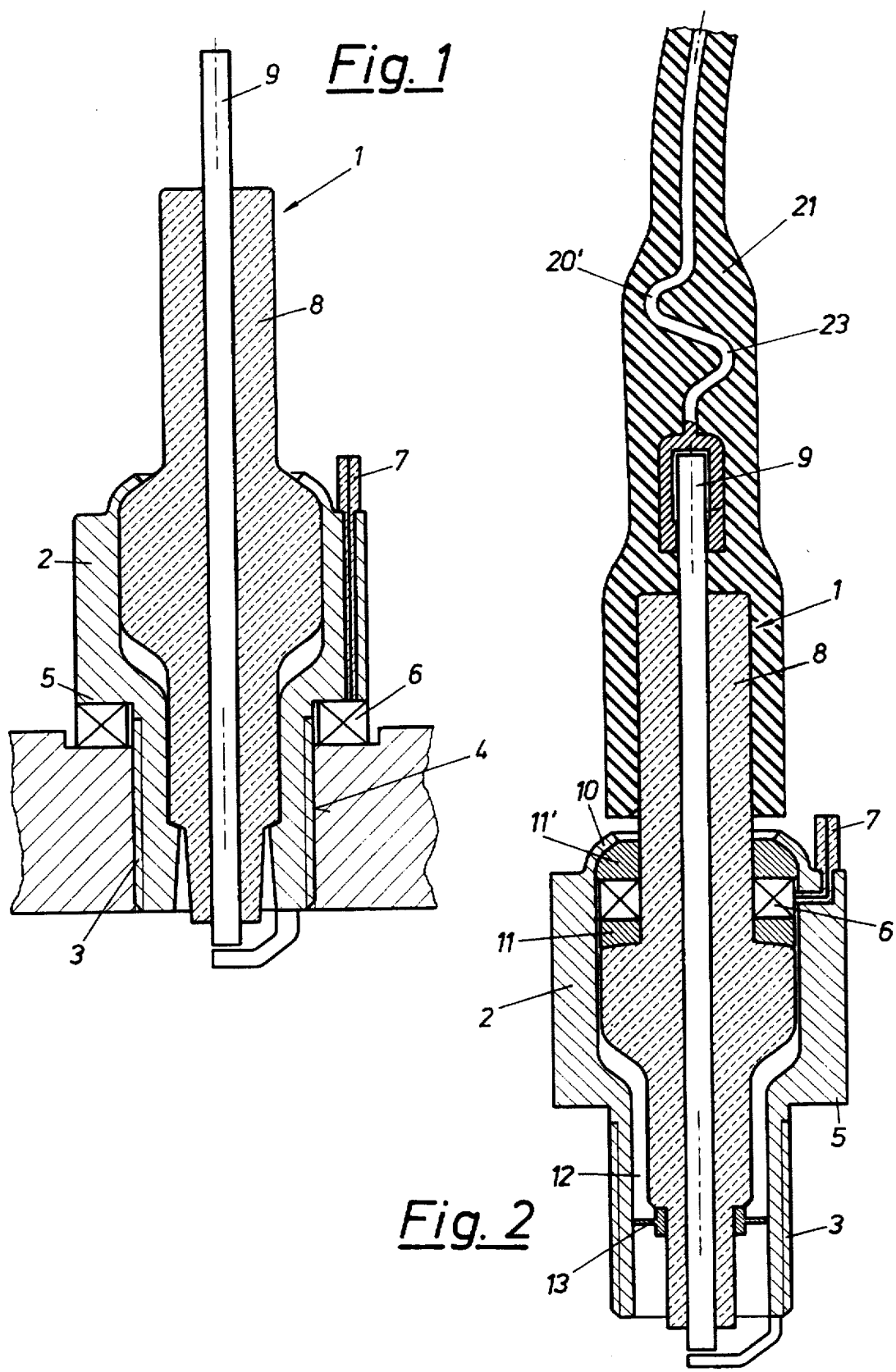

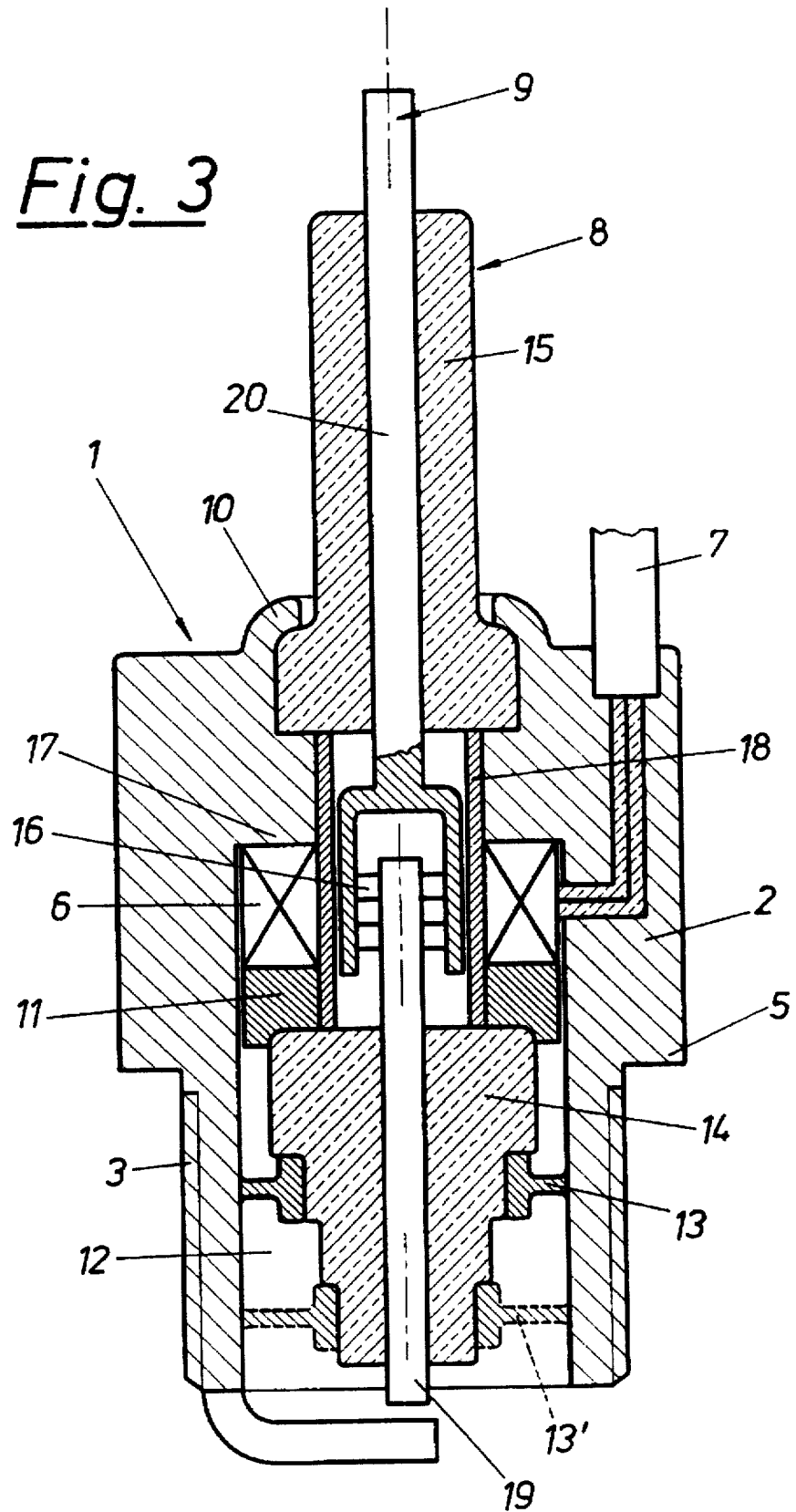

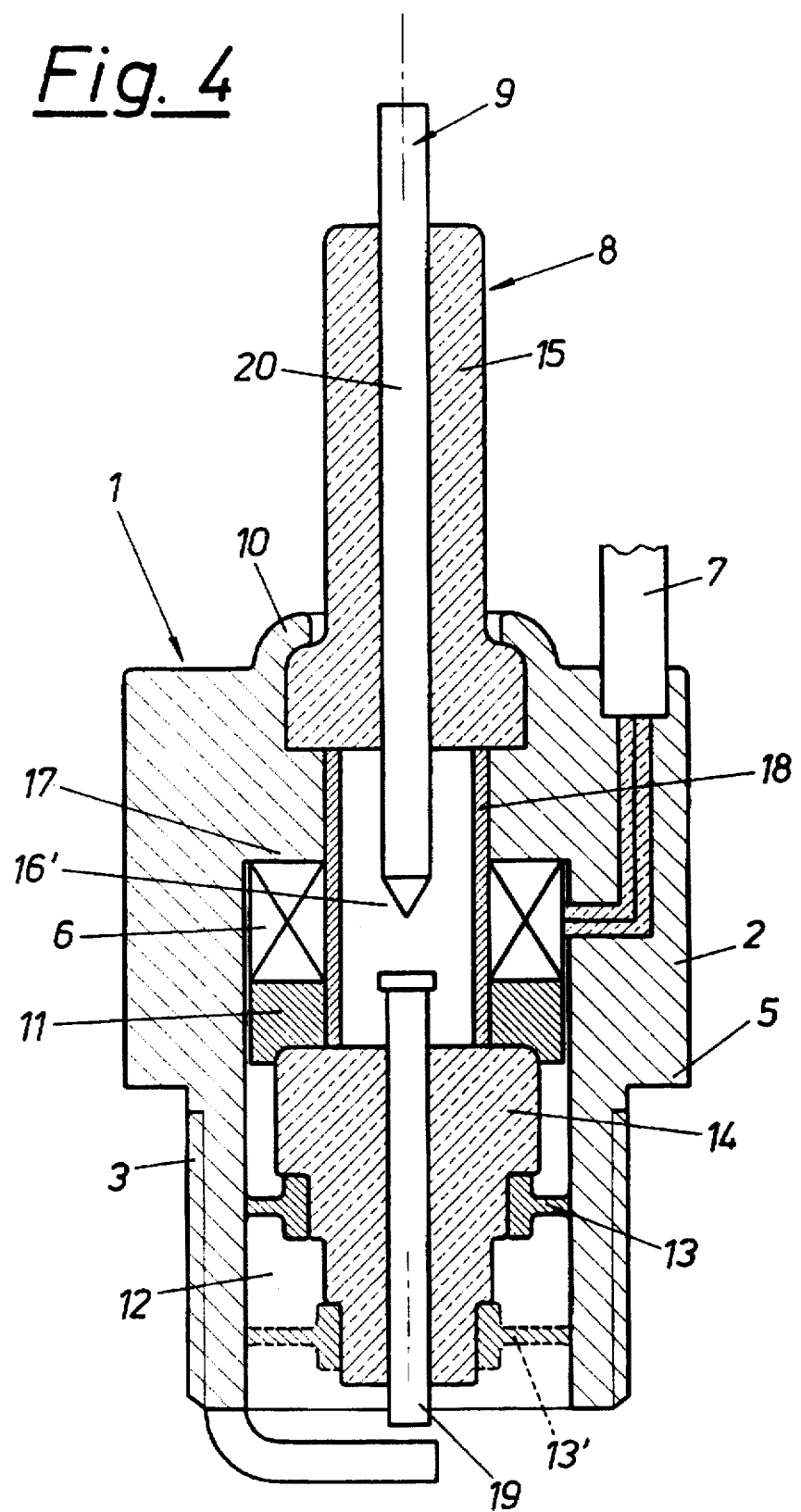

5,726,351

SPARK PLUG COMPRISING A FORCE MEASURING ELEMENT

BACKGROUND OF THE INVENTION

This invention relates to a spark plug comprising an insulating body held in a casing and containing an inner electrode, and a force-measuring element measuring the pressure acting on the spark plug, where the insulating body rests against the casing via the force measuring element when pressure is applied in an axial direction, and a radial gap is formed between the insulating body and the casing of the spark plug.

DESCRIPTION OF THE PRIOR ART

The pressure in the combustion space is the main variable for assessing the combustion process in an internal combustion engine. For this reason the pressure in the combustion space must be measured frequently and is a vital factor in engine management and engine control. In the latter instance it is considered most desirable that no additional bore should be required for pressure sensing in the combustion space. One way of avoiding such a bore is to use a spark plug with an integrated pressure-measuring function.

Previous devices of this type may essentially be divided into two groups. In one group a very small pressure sensor is integrated into the body of the spark plug; however, the minuteness of such sensors entails manufacturing problems, susceptibility to damage, large measuring errors, and considerable production cost. Relevant examples are discussed in EP 0 441 157 A2 and EP 0 581 067 A1.

In the second group force measuring gaskets are employed, which are inserted in the spark plug instead of a sealing washer or together with it, and measure the change in sealing force which is caused by the pressure in the combustion space. This group also includes spark plugs whose force-measuring element is attached to the casing of the spark plug. A main disadvantage of this second group is that a comparatively large mass must be supported by the measuring element, i.e., the entire mass of the spark plug and a major portion of the ignition cable. As a consequence, large noise signals are generated upon acceleration in addition to a low characteristic frequency of the system.

Another disadvantage is that the casing of the spark plug as well as the place where it is screwed into the cylinder head are subject to differing deformations due to differences in temperature, which deformations will directly act on the force-measuring element and cause large measuring errors.

In U.S. Pat. No. 4,169,388 a pressure-sensing spark plug is disclosed in which the actual piezoelectric force pick-up is located between a first part of the casing which is configured as a flange and a second part of the casing which is of annular configuration. The outer rim of the flange is sealed to the annular part by means of a cylindrical sealing ring. The drawback of this design is that deformations of the flange have a direct effect on the measuring element and the measuring signal. Moreover, the gas forces to be measured are distributed over the casing and the measuring element, which are connected in parallel with respect to the effects of these forces. As a consequence, signal height is reduced since only parts of the gas forces act on the measuring element. Further disturbances are caused by the action of large mass forces as parts of the casing are supported on the measuring element in addition to the insulating body.

A spark plug of the type mentioned in the introductory passage is discussed in DE 31 30 238 A1, for example. In this instance a piezoelectric transducer is integrated into the housing of an accessory part of the internal combustion engine, preferably into a spark plug, in such a way that forces which act on the insulating body in axial direction are introduced into an annular force-measuring element which is supported on a step of the casing of the spark plug. As the part of the insulating body facing the combustion space is pressed against a shoulder inside the casing of the spark plug, and is preloaded by this shoulder, unwanted axial forces are permitted to enter at this site.

SUMMARY OF THE INVENTION

It is an object of the invention to avoid the above disadvantages and to improve a spark plug with a force-measuring element in such a way that the sources of noise signals are eliminated or their interference potential is reduced.

In the invention this is achieved by sealing the radial gap on the side of the combustion space by means of an axially-elastic sealing element, which is additionally used for radial support of the insulating body against the casing of the spark plug.

The elastic sealing element between the interior of the spark plug and the combustion space will prevent axial forces from entering the measuring element via the casing of the spark plug, and deformations of the casing are transferred to the insulating body, and thus the measuring element, to a very limited extent only. Any measuring errors resulting therefrom are thus considerably reduced.

It is provided in an enhanced variant of the invention that the elastic sealing element be configured as an annular membrane. The properties of such a membrane are similar to those encountered with conventional pressure sensors where the casing forms a tight but flexible seal with the pressure transmission element. In further development the ignition cable is configured as a low-mass component, i.e., at least where it is connected to the inner electrode, and the inner electrode of the ignition cable is configured as a resilient element, such as a loop or a helix. Due to the soft transition to the relatively rigid ignition cable, only a small portion of the mass of the cable will be of influence. Further weight savings may be obtained by optimization of the insulator as regards material and small dimensions.

In a particularly favorable variant of the invention the proposal is put forward that the insulating body comprise a first part which faces the combustion space and contains the part of the inner electrode adjacent to the combustion space, and a second part which contains the ignition cable connection and the part of the inner electrode adjacent to the cable, the two parts of the insulations body being largely decoupled mechanically, and that the first part be supported on the casing of the spark plug, i.e., at least axially, via the force-measuring element, the axially-elastic sealing element taking up radial supporting forces, and that the second part of the insulating body be held firmly in the casing off the spark plug, and further that an elastic insulating sleeve be provided for bridging the area between the two parts of the insulating body. In this area the insulating body is divided in order to reduce the mass coupled to the force-measuring element, such that the part adjacent to the combustion space, which rests against the force-measuring element, has only the length necessary for reaching the desired thermal value and securely fastening the inner electrode. The part of the insulating body required for exterior insulation on the side adjacent to the cable, and the cable connection itself are directly attached to the casing, such that their mass cannot act on the force-measuring element. In this manner the mass coupled to the force-measuring element is largely diminished, as well as the measuring error resulting therefrom.

According to the invention the connection between the two parts of the inner electrode may be configured as an electrically conductive, flexible intermediate piece, or as a free spark gap.

In another preferred variant of the invention the insulating body again is divided into two parts that are mechanically decoupled. The invention provides in this instance that the insulating body have a first part which is adjacent to the combustion space and contains the inner electrode, and which is optimized to minimum mass, and that a second part of the insulating body be designed as part of the ignition cable, the first part of the insulating body being supported on the casing of the spark plug, at least axially, via the force-measuring element, and the axially-elastic sealing element being capable of taking up radial supporting forces.

It is again possible in this instance that the connection between the inner electrode and the ignition cable be configured as an electrically conductive, flexible intermediate piece, or as a free spark gap.

In the above variant the part next to the cable is essentially used for providing a reliable insulation at the transition between spark plug and ignition cable. The parts of the insulating body integrated into the cable connector may be made of plastic material or rubber due to the comparatively low temperature prevailing there, which will largely decouple this part mechanically from the part of the insulating body adjacent to the combustion space. The advantages of this variant are found in the low mass acting on the measuring element, and in the fact that the spark plug itself, which must be regarded as a high-wear component, can be manufactured cheaply while maintaining high measuring standards.

BRIEF DESCRIPTION OF THE DRAWINGS

Following is a brief description of the drawings, in which

FIG. 1 shows a spark plug and force-measuring element of the prior art,

FIG. 2 shows a spark plug and force-measuring element according to the invention, and FIGS. 3 to 5 show preferred variants of FIG. 2.

DETAILED DESCRIPTION OF PREFERRED EMBODIMENTS

Figure 5:
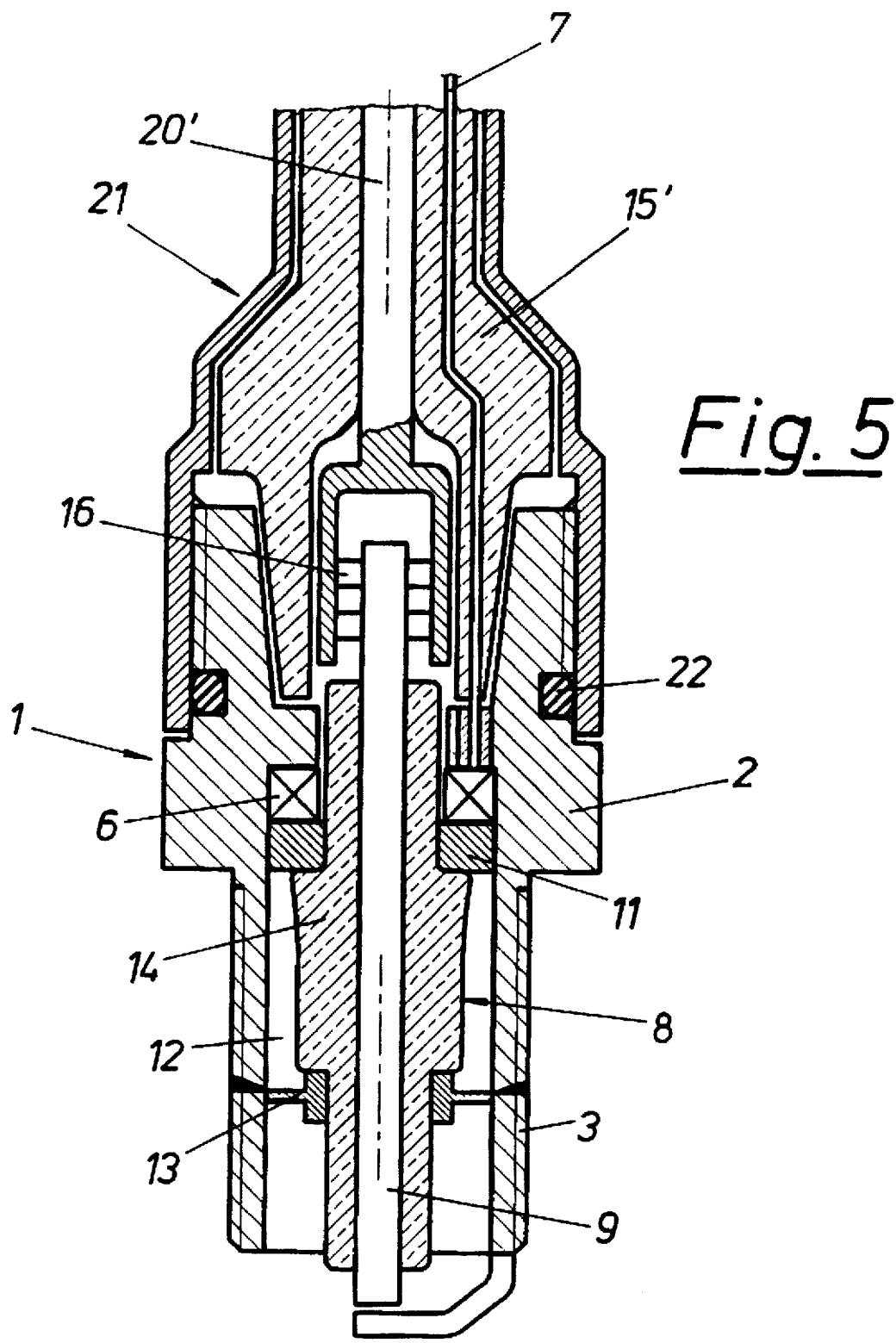

The prior art pressure-sensing spark plug 1 shown in FIG. 1 has a threaded casing 2 (external thread 3) which can be screwed into the spark plug bore 4 of a cylinder head (not shown in detail). In the area of the sealing shoulder 5 of the casing 2 a force-measuring element 6 is provided which transforms axial pressure forces into an electrical signal proportional to these pressure forces, which signal can be picked up via the signal lead 7. The casing 2 of the spark plug is provided with an insulating body 8, which is preferably made of porcelain and contains the inner electrode 9.

To reduce the mass coupled to the force-measuring element, the configuration shown in FIG. 2 provides that the force-measuring element 6 of the spark plug 1 be arranged in an axial direction between the insulating body 8 and the casing 2, such that the insulating body 8 subject to the pressure of the combustion space, together with the inner electrode 9, is pressed against the casing 2, or rather a sealing shoulder 10 of the casing, via the force-measuring element 6. A force-mediated connection between insulating body 8 and casing 2 of the spark plug is obtained by means of force-transmission elements or conformal elements 11, 11', which establish the flow of force between the uneven porcelain surface of the insulating body 8 and/or the beaded flange or sealing shoulder 10 of the casing and the machined surface of the measuring element 6. The conformal element 11' may be used as a sealing element at the same time.

Between the insulating body 8 and the casing 2 of the spark plug there is a radial gap 12 which is sealed against the combustion space by means of an axially-elastic sealing element 13. The sealing element 13, which is preferably configured as an annular membrane, may also serve as a radial support of the insulating body 8 against the casing 2. A nonrigid transition to the comparatively rigid ignition cable 21 may be obtained by a resilient inner electrode 20', which may be configured as a helix 23, for instance. In addition, this area may contain soft insulating material, such as rubber.

For further reduction of the mass coupled to the force-measuring element 6, the variant shown in FIG. 3 proposes that the insulating body 8 be divided into a first part 14 facing the combustion space, and a second part 15 carrying the cable connection. The inner electrode 9 is also divided into two parts, i.e., 19 and 20, which, are electrically connected by a flexible intermediate piece 16. The first part 14 of the insulating body 8, which rests against the conformal element 11, is axially supported via the force-measuring element 6 on a shoulder 17 of the casing 2, and is radially held by the elastic membrane 13. Different requirements as to the thermal value of the spark plug may be met by different positions of the membrane 13, an alternative position being referred to as 13'. The second part 15 of the insulating body 8 is firmly held in the casing 2 of the spark plug.

Next to the electrically conductive intermediate piece 16 of the inner electrode 9 is placed an electrical insulating sleeve 18, which is used to cover the area between the two parts 14 and 15 of the insulating body 8.

The variant shown in FIG. 4 largely corresponds to that of FIG. 3. The two parts 19 and 20 of the inner electrode are completely decoupled mechanically due to the free spark gap 16' provided in this instance.

The signal lead 7 schematically indicated in FIGS. 2 to 4 is preferably combined with the ignition cable, for example, rotation-symmetrically to the cable connection.

The variant of FIG. 5 is characterized by the fact that part 14 of the insulating body 8, which is adjacent to the combustion space and contains the inner electrode 9 is optimized to minimum mass. The second part 15' of the insulating body is configured as connector of the ignition cable 21. The inner electrode 20' of the ignition cable and the inner electrode 9 of the spark plug are connected via an electrically conductive flexible element 16, which may be configured as a screw-in or plug-in part. As shown in FIG. 4, this connection could also be configured as a free pre-spark gap. Between the connector of the ignition cable 21 and the casing 2 of the spark plug a sealing may be provided, i.e., preferably an O-ring 22, to ensure sufficient protection against moisture. The signal lead 7 is preferably integrated into the connector 15' of the ignition cable 21.

I claim:

1. A spark plug comprising an insulating body held in a casing and containing an inner electrode, a force-measuring element measuring pressure acting on the spark plug, said insulating body resting against said casing via said force-measuring element when pressure is applied in an axial direction, and an axially-elastic sealing element sealing a radial gap between said insulating body and said casing of the spark plug towards a combustion space, said sealing element additionally radially supporting said insulating body against said casing of the spark plug, wherein said insulating body comprises a first part which faces said combustion space and contains a first part of said inner electrode adjacent to said combustion space, and a second part which contains an ignition cable connection and a second part of said inner electrode, said first and second parts of said insulating body being decoupled mechanically, having an elastic insulating sleeve for bridging the area between said first and second parts of said insulating body and wherein said first part of said insulating body is supported at least axially via said force-measuring element on said casing of the spark plug, and radially via said axially-elastic sealing element, and wherein said second part of said insulating body is held firmly in said casing of the spark plug.

2. A spark plug according to claim 1, including an electrically conductive, flexible intermediate piece connecting said first and second parts of said inner electrode.

3. A spark plug according to claim 1, wherein a free spark gap is defined between said first and second parts of said inner electrode.

4. A spark plug comprising an insulating body of electrically insulating material held in a casing and containing an inner electrode, a force-measuring element measuring pressure acting on the spark plug, said insulating body resting against said casing via said force-measuring element when pressure is applied in an axial direction, and an axially-elastic sealing element sealing a radial gap between said insulating body and said casing of the spark plug towards a combustion space, said sealing element additionally radially supporting said insulating body against said casing of the spark plug, wherein said insulating body has a first part which is adjacent to said combustion space and contains said inner electrode optimized to minimum mass, and wherein a second part of said insulating body is designed as part of an ignition cable, said first part of said insulating body being supported at least axially via said force-measuring element on said casing of the spark plug and radially via said axially-elastic sealing element.

5. A spark plug according to claim 4, including an electrically conductive, flexible intermediate piece connecting said inner electrode and said ignition cable.

6. A spark plug according to claim 4, wherein a free spark gap is defined between said inner electrode and said ignition cable.

7. A spark plug comprising an insulating body held in a casing and containing an inner electrode, a force-measuring element measuring pressure acting on the spark plug, said insulating body resting against said casing via said force-measuring element when pressure is applied in an axial direction, and an axially-elastic sealing element sealing a radial gap between said insulating body and said casing of the spark plug towards a combustion space, said sealing element additionally radially supporting said insulating body against said casing of the spark plug, wherein an ignition cable of said spark plug is configured as a low-mass component, at least in a region adjacent to said inner electrode, and wherein said inner electrode of said ignition cable is configured as a resilient element.

* * * * *